United States Patent [19]

Shirakuma

[11] Patent Number: 4,666,180
[45] Date of Patent: May 19, 1987

[54] CONTROL SYSTEM FOR HYDRAULIC DAMPERS

[75] Inventor: Takashi Shirakuma, Kanagawa, Japan

[73] Assignee: Tokico, Ltd., Kanagawa, Japan

[21] Appl. No.: 808,244

[22] Filed: Dec. 12, 1985

[30] Foreign Application Priority Data

Dec. 20, 1984 [JP] Japan ............................ 59-193572[U]

[51] Int. Cl.⁴ ................................................ F16F 9/34
[52] U.S. Cl. ..................................... 280/707; 188/299; 188/318; 188/319; 364/424
[58] Field of Search ......................... 280/707, 708, 6.1; 188/299, 266, 282, 285, 316, 318, 322.15, 158, 1.11, 319, 287; 364/424; 267/64.15–64.26

[56] References Cited

U.S. PATENT DOCUMENTS

| | | | |
|---|---|---|---|
| 3,559,776 | 2/1971 | Schultze | 188/299 |
| 4,313,529 | 2/1982 | Kato et al. | 188/319 X |
| 4,391,452 | 7/1983 | Ohmori | 280/707 X |
| 4,463,839 | 8/1984 | Ashiba | 188/319 X |
| 4,526,401 | 7/1985 | Kakizaki et al. | 280/707 |
| 4,550,286 | 10/1985 | Holland et al. | 280/707 X |
| 4,568,096 | 2/1986 | Yew et al. | 280/707 X |

Primary Examiner—Douglas C. Butler
Attorney, Agent, or Firm—Wenderoth, Lind & Ponack

[57] ABSTRACT

A control system for controlling the damping force of a plurality of hydraulic dampers, each of which includes a damping force producing mechanism; a damping force adjustment member for adjusting the effective passage area of an oil passage in the damping force producing mechanism; an actuator connected to the damping force adjustment member; and an electrical power supply circuit for supplying electrical power to the actuator. The system includes: a first circuit for monitoring the operating time of the actuator and, when the operating time exceeds a first predetermined value, for forcibly moving the damping force adjustment member to a predetermined position by the actuator so as to thereby perform a forced damping force adjustment control and a second circuit for monitoring the operating time of the forced first circuit and, when the operating time of the first circuit exceeds a second predetermined value, for stopping the forced damping force adjustment control.

4 Claims, 7 Drawing Figures

CONTROL SYSTEM FOR HYDRAULIC DAMPERS

BACKGROUND OF THE INVENTION

This invention relates to a hydraulic damper of adjustable damping force type and, particularly, to a control system for controlling the damping force of the hydraulic dampers of aforesaid type for use in a vehicle.

Various proposals have been made with respect to a hydraulic damper of adjustable damping force type which, when being incorporated on a vehicle such as an automobile, enables the damping force to be changed in accordance with the driving conditions of the vehicle and the conditions of the road, thereby improving comfort and safety in driving the vehicle and improving the steering characteristics.

In general, a vehicle usually has a plurality of hydraulic dampers corresponding in number to the wheels of the vehicle, each of the dampers including a damping force producing mechanism; a damping force adjustment member for adjusting the effective passage area of an oil passage in the damping force producing mechanism; an actuator connected to the damping force adjustment member; and an electric power supply circuit for supplying electric power to the actuator. The damping force producing mechanism is provided with a conductive disc having a notch in a portion thereof which is rotationally driven by the actuator, and a plurality of brushes for controlling the operation of the actuator and indicating the selected damping force in accordance with the conductive conditions between the brushes and the disc. The brushes usually contact the disc and, when the brushes face the notch of the disc, they are not in contact.

In the conventional damping force producing mechanism described above, if a malfunction condition such that any of the brushes is shorted-circuit occurs, it is impossible for the damping force to be selected.

SUMMARY OF THE INVENTION

The present invention has been accomplished in view of the aforesaid circumstances and aims to provide a control system for controlling the damping force of a plurality of hydraulic dampers and for monitoring malfunction conditions in the hydraulic dampers.

Another object of the present invention is to provide a control system for controlling the damping force of a plurality of hydraulic dampers, each of the dampers including a damping force producing mechanism; a damping force adjustment member for adjusting the effective passage area of an oil passage in the damping force producing mechanism; an actuator connected to the damping force adjustment member; and an electric power supply circuit for supplying electric power to the actuator, the control system characterized by comprising: first means for monitoring the operating time of the actuator and, when the operating time exceeds a first predetermined value, for forcibly moving the damping force adjustment member to a predetermined position by means of the actuator to thereby perform a forced damping force adjustment control; and second means for monitoring the operating time of the forced first means and, when the operating time of the first means exceeds a second predetermined value, for stopping the forced damping force adjustment control.

According to the present invention, fatal malfunction conditions in the hydraulic dampers, such as locking of the damping force producing mechanism or a runaway condition of the mechanism, can be easily detected and indicated, and the damping force adjustment member can be forcibly moved to a predetermined position to select the desired damping force of the dampers when the malfunction conditions occur, and, therefore, the security of the damping force adjustment control can be effectively raised.

In addition, according to the present invention, after the completion of the forced damping force adjustment control, the power supply to the actuator for driving the damping force producing mechanism can be immediately stopped. Accordingly, secondary types of damage occurring in the dampers, such as a spark in the control system, can be reliably prevented.

Further objects and advantages of the invention will become apparent from the following detailed description of some preferred embodiments, with reference to the accompanying drawings.

DETAILED DESCRIPTION OF THE PREFERRED EMBODIMENT

Figures 1, 2:
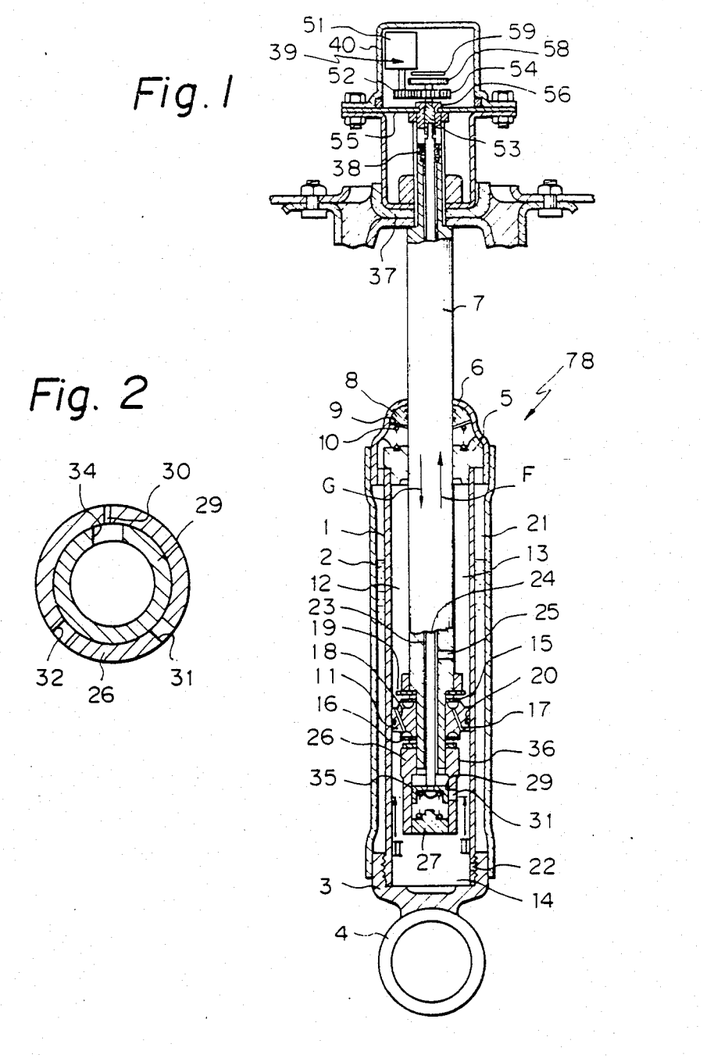
FIG. 1 is a longitudinal section through a hydraulic damper to which the control system according to the invention may be applied.
FIG. 2 is a cross section taken along the line II—II in FIG. 1.

FIG. 1 shows a hydraulic damper 78 of adjustable damping force type which comprises an inner tube 1 coaxially surrounded by an outer tube 2, a cap 3 secured to lower ends of the inner and outer tubes 1 and 2, and a mounting ring 4 secured integrally to the cap 3 for mounting the hydraulic damper 78 on such as a wheel axle and the like of a vehicle. A rod guide 5 and a cap 6 are fitted respectively on the upper ends of the inner tube 1 and the outer tube 2. A piston rod 7 slidably extends through the rod guide 5 and the cap 6. A seal 8 and a seal 9 are provided between the cap 6 and the rod guide 5, and the seal 8 is urged against the inner surface of the cap 6 by a spring 10 which acts between the rod guide 5 and the seal 9. The seal 8 sealingly engages with the piston rod 7, and the seal 9 encircles the piston rod 7 and engages with the upper surface of the rod guide 5 to constitute a check valve permitting fluid flow in the radially outward direction and preventing fluid flow in the radially inward direction.

A piston 11 is slidably received in the inner tube 1 to partition the interior of the inner tube 1 into two liquid chambers 13 and 14. The piston 11 is connected to the piston rod 7 and has passages 17 and 18 therethrough with one end of each thereof cooperating respectively with disc valves 15 and 16. Further, a passage defining a fixed orifice is branched from either of the passages 17 and 18 to permanently communicate with the chambers 13 and 14. The valve 15 opens when the pressure in the chamber 14 is higher than the pressure in the chamber 13 by a predetermined level to permit the liquid flow in the passages 17 (only one of which is shown in FIG. 1) thereby generating a damping force in the contraction stroke of the damper or the movement of the piston rod 7 in the direction shown by arrow G, and closes when the pressure difference between the chambers 14 and 13 is lower than the predetermined level. The valve 16 opens when the pressure in the chamber 13 is higher than the pressure in the chamber 14 by a predetermined level thereby generating a damping force during the extension stroke of the damper. Shown at 19 is a wash, and at 20 is a piston ring.

An annular chamber 21 is defined between the inner and outer tubes 1 and 2 and is communicated permanently with the chamber 14 through a radial hole 22 formed in the lower end portion of the inner tube 1. The chambers 13 and 14 and the lower portion of the chamber 21 are filled with hydraulic liquid and pressurized gas is filled in the upper portion of the chamber 21.

A through bore 23 is formed coaxially in the rod 7, and a connecting rod 24 extends rotatably through the bore 23. Further, a tubular member 26 is screw-threadingly connected to the lower end of the rod 7, and the lower end of the tubular member 26 is closed by a cap 27.

A shutter 29 is secured to the lower end of the connecting rod 23 and is rotatably retained in the tubular member 26. The tubular member 26 has in the side wall thereof radial holes 30, 31 and 32 of different diameters at an angularly equally spaced relationship of 120°, as shown in FIG. 2. When the shutter 29 is rotated through the connecting rod 24, the radial holes 30, 31 and 32 acting as orifices are selectively opened and closed by a hole 34 in the shutter 29. The diameters of the holes 30, 31 and 32 are sequentially increased in that order. The hole 34 in the shutter 29 extends in the side wall of the shutter 29 by a predetermined width which is larger than the diameter of the largest hole 32 and is smaller than the space between the holes 30, 31 and 32. A spring 35 is disposed between the shutter 29 and the cap 27 to bias the shutter 29 in the upward direction. The shutter 29 further has axial holes 36 having an effective passage area larger than the hole 32. The radial hole 25, the annular space between the bore 23 and the connecting rod 24, the axial hole 36, the hole 34 and any of radial holes 30, 31 and 32 constitute a passage for the damping force producing mechanism of the hydraulic damper 78.

The upper end of the piston rod 7 is connected to the chassis of the vehicle through a mounting mechanism 37. An O-ring 38 is provided in the upper end portion of the bore 23 to seal the connecting rod 24. A casing 40 of a driving mechanism 39 for rotating the connecting rod 24 and the shutter 29 is mounted on the upper end of the rod 7. A D.C. motor 51 is mounted on the casing 40, and a gear 52 is mounted on the output shaft of the motor 51. The gear 52 meshes with a gear 54 which is secured to a shaft 53, whereby the gears 52 and 54 constitute a reduction gear mechanism. The shaft 53 is connected to the connecting rod 24 and is rotatably supported on a base plate 55 of the casing 40 through a bearing 56.

Figure 3:
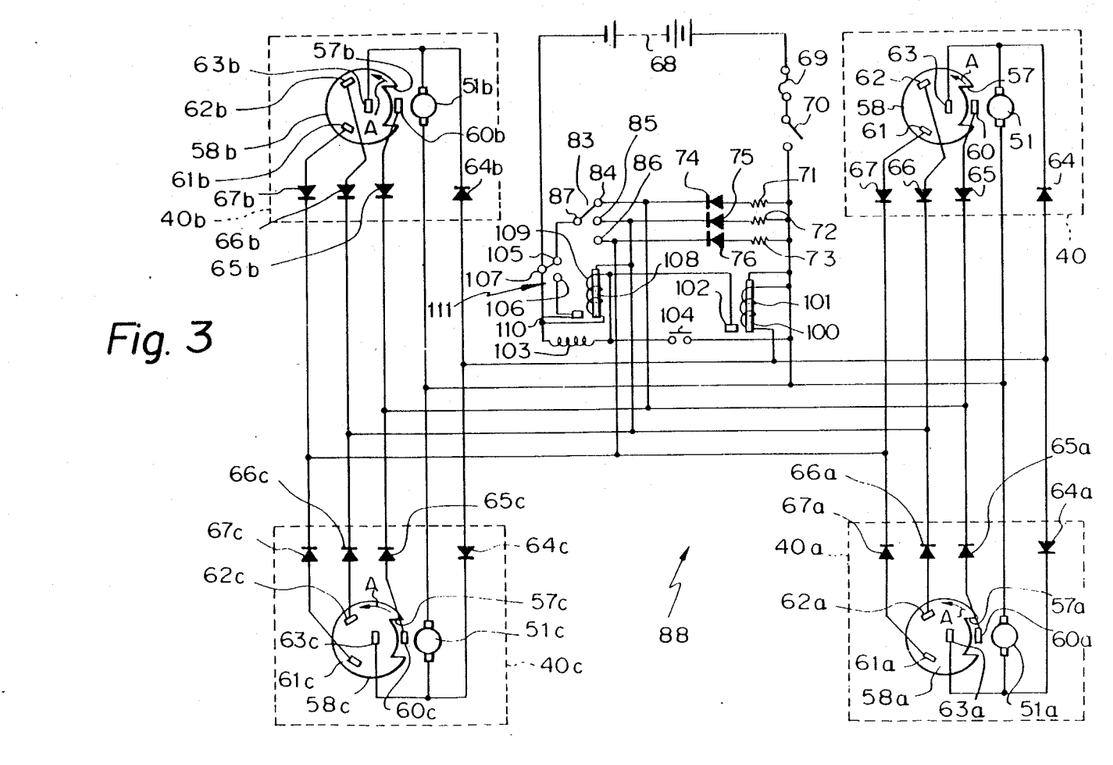
FIG. 3 is a circuit diagram illustrating a first embodiment of the present invention.

Referring now to FIG. 3, there is shown a first embodiment of the present invention.

A conductive disc 58 having a notch 57 is secured to the shaft 53 and a brush-fitting plate 59 is supported on the casing 40 against the surface of the disc 58. Brushes 60, 61 and 62 are provided on the fitting plate 59 at intervals of about 120° in the peripheral direction, and the brushes electrically contact the disc 58 if they do not face the notch. The fitting plate 59 is also provided with a brush 63 which is in constant electrical contact with the disc 58, independently of the position of the notch 57. The brush 63 is electrically connected to both one end of the motor 51 and one element of a diode 64, the brush 60 is connected to one element of a diode 65, the brush 62 is connected to one element of a diode 66, and the brush 61 is connected to one element of a diode 67. A set of components consisting of the motor 51, the disc 58, the hydraulic damper 78 and the associated elements, which are contained in the casing 40, is provided for each of the wheels of the vehicle. It should be noted that the same numbers are used to designate similar elements and the characters a, b and c are appended to these numbers so as to distinguish the elements associated with the respective wheels. One terminal of a D.C. power source 68 is connected to one of the terminals of the respective motors 51, 51a, 51b and 51c and one of the terminals of the respective resistors 71, 72 and 73 through a fuse 69 and a switch 70, while the other terminals of the respective resistors 71, 72 and 73 are connected to one of the elements of respective light emitting diodes 74, 75 and 76, and the other elements of the light emitting diodes 74, 75 and 76 are connected to the fixed contacts 84, 85 and 86 of a damping-force selector switch 83, and are connected to diodes 65, 65a, 65b and 65c, diodes 66, 66a, 66b and 66c, and diodes 67, 67a, 67b and 67c. The switch 70 is also connected to both one terminal of a bimetal device 100 and one terminal of a heater 101 which is provided on the bimetal device. The bimetal device 100 is designed to bring the other terminal thereof into contact with a contact 102 after the heater 101 has been energized for a predetermined period of time. The contact 102 is connected to a negative terminal of the power source 68 through an excitation coil 103 of a relay. One terminal of the excitation coil 103 is connected to the switch 70 through a first contact device 104 of the relay. In a second contact device 111 of the relay, a fixed contact 105 is connected to the movable contact 87 of the selector switch 83, and a movable contact 107 is connected to the negative terminal of the power source 68. One terminal of a bimetal device 108 is connected to the fixed contact 85 of the selector switch 83, and the other terminal of the device 108 is in contact with a contact 110 under a normal condition and is placed out of contact when a heater 109 is energized. The contact 110 is connected to the fixed contact 106 of the second contact device 111. The heater 109 is connected across the excitation coil 103 of the relay.

In the electric power supply circuit 88 shown in FIG. 3, the resistors 71, 72 and 73, the light-emitting diodes 74, 75 and 76 form an indicator circuit, and the diodes 64, 64a, 64b and 64c; the diodes 65, 65a, 65b and 65c; the diodes 66, 66a, 66b and 66c; and the diodes 67, 67a, 67b and 67c form an inhibiting circuit for inhibiting the supply of power to an actuator associated with a damping force adjustment member. Preferably, the switches 70 and 83, and the diodes 74, 75 and 76 acting as the indicator elements are operably and visually provided on the dashboard of the vehicle.

In the operation of the damping force adjustment mechanism described above, if the switch 70 is turned on, the movable contact 87 of the switch 83 is connected to the contact 84 thereof, the movable contact 107 of the second contact device 111 is connected to the fixed contact 105, the notch 57 is positioned as shown in the drawing, the brush 60 and the disc 58 are not in contact and the diode 64 is reverse-biased; thus the current from the power source 68 is not supplied to the motor 51; the gears 52 and 54, the shaft 53, the connecting rod 24, and the shutter 29 remain stopped; the hole 34 is aligned with the hole 30; and the chamber 13 communicates with the chamber 14 through the holes 25, 23, 36, 34 and 30. Thus, the movement of the piston 11 in an extended direction shown by the arrow F in the drawing causes the shock absorber or the hydraulic damper 78 to produce a damping force determined by the fixed orifice, the valve 16, and the hole 30 which are formed in the piston 11. In this case, the hardest damping force can be obtained because the diameter of the hole 30 is smaller than those of the holes 31 and 32. The movement of the piston 11 in a contracted direction as shown by the arrow G also causes the damper 78 to produce the hardest damping force. In this condition, only the diode 74 is allowed to pass a current therethrough and emit light therefrom, the current being limited by the resistor 71. It can be understood, therefore, that the damper 78 is designed to produce the hardest damping force when the diode 74 emits light.

On the other hand, if the switch 87 is operated to bring the movable contact 87 into contact with a contact 85, the current from the power source 68 flows through the motor 51, the brush 63, the disc 58, the brush 62, the diode 66, and the contacts 105 and 107 to energize the motor 51 so that the gears 52 and 54 are rotated, and hence the disc 58 is rotated in the direction shown by A. Thus, if the notch 57 is rotated to a position facing the brush 62, the disc 58 and the brush 62 are not in contact, thereby interrupting the current supply from the power source 68 to the motor 51 so as to stop the rotation thereof. Since the shutter 29 also is rotated in response to the rotation of the gear 54 in the direction of A, when the notch 57 faces the brush 62, the hole 34 is forced into alignment with the hole 31, and the chamber 13 communicates with the chamber 14 through the holes 25, 23, 36, 34 and 31. As a result, the movement of the piston 11 in both the F and G directions causes the hydraulic damper 78 to produce an intermediate damping force, because the diameter of the hole 31 is larger than that of the hole 30. From the time when the contact 87 is in contact with the contact 85 to the time when the notch 57 faces the brush 62, and the brush 62 and the disc 58 are placed out of contact, the current, which is limited by the resistors 71 and 73, flows through the diodes 74 and 76, and the diode 64 so that all of the diodes 74, 75 and 76 emit light. As a result, it can be determined that the adjusting operation is currently functioning. After that, because the current limited by the resistor 72 flows through only the diode 75, causing it to emit light, it can be determined that the adjusting operation is completed. As will be understood, the indicator circuit is designed to operate between two states so that the adjusting operation can be distinguished from the completion thereof.

If the switch 87 is operated to bring the movable contact 87 into contact with a contact 86, the operation can be explained in the same manner.

The operation of the circuit shown in FIG. 3 has been explained above, in which the rotations of all of the discs 58, 58a, 58b and 58c are mutually synchronized, and the contacting or non-contacting actions between the notches 57, 57a, 57b and 57c and the corresponding brushes are also mutually synchronized for all of the wheels.

When, in order to obtain a relatively hard damping force, for example, the notches 57, 57b and 57c of the respective discs 58, 58b and 58c have been made to face the brushes 60, 60b and 60c, respectively, but the notch 57a has not yet reached the brush 60a after the positioning of the switch 87 as shown in FIG. 3, if the diode 64 were not provided, the current from the power source 68 would flow through the motor 51, the diode 64a, the brush 63a, the disc 58a, the brush 60a, the diode 65a and the switch 83 in sequence, so that the motor 51 and hence the disc 58 would still be rotated, despite the completion of the adjustment operation, as described above. This means that the diodes 64, 64a, 64b and 64c function to inhibit such kind of current, as well as the diodes 65, 65a, 65b and 65c; the diodes 66, 66a and 66b and 66c; and the diodes 67, 67a, 67b and 67c.

While the motor 51 is being driven, the heater 101 of the bimetal device 100 is connected to the negative terminal of the power source 68 through the diode 64, the brush 63, the brush 62, the diode 66 and the contact 85 of the selector switch 83 to thereby heat the device 100. The heater 101 is provided for all four hydraulic dampers in common, and heats the bimetal device 100 until the damping force adjustment control for the dampers is completed. With the heating of the bimetal device 100, it is close to and then in contact with the contact 102. If the period of time which ends at the point when the bimetal device 100 contacts the contact 102 is set to a value which is sufficient to exceed such time as is required to perform the damping force adjustment control, the contact action as described above does not occur under a normal damping force adjustment control operation.

On the other hand, if the brush 63a remains shorted-circuit and connected to the ground due to, for example, the presence of a malfunction condition in the casing 40a, the heater continues to heat the bimetal device 100 and, since it sufficiently exceeds the time required to perform the damping force adjustment control, the bimetal device 100 contacts the contact 102 due to this heating, thereby energizing the excitation coil 103 of the relay therethrough. As a result, the first contact device 104 becomes conductive and the relay is thus in a self-holding condition. At the same time, in the second contact device 111 of the relay, the movable contact 107 is switched from the fixed contact 105, which is connected to the movable contact 87 of the selector switch 83, to the fixed contact 106, that is, the other terminal of the bimetal device 108 is connected to the negative terminal of the power source 68 through the movable contact 107 which is switched to the fixed contact 106. Thus, the bimetal device 108 can act to forcibly bring the movable contact 107 into contact with the fixed contact 106 and hence to forcibly connect the contact 107 with the contact 85 of the selector switch 83 by which the adjustment control for producing damping force such as the intermediate damping force can be performed. During the forced damping force adjustment control as described above, the heater 109 remains energized under the conductive condition of the first contact device 104, so that the bimetal device 108 continues to be urged such as to separate from the contact 110. After that, when the other end of the bimetal device 108 and the contact 110 assume a non-contact or open condition, the forced damping force adjustment control is completed and fixed. Under this condition, the adjustment control described above is stopped until the relay is reset.

When the malfunction condition described above occurs, the diode 75 acting as the indicator is connected to the negative terminal of the power source 68 through the bimetal device 108, the contact 110, and the contacts 106 and 107 of the relay to thereby emit light. On the other hand, when the forced damping force adjustment control is completed and fixed, the bimetal device 108 and the contact 110 are not in contact so that the diode 75 is deenergized.

It has been assumed that the brush 63a is shorted-circuit. Alternatively, assuming that the brush 63a is not shorted-circuit, the damping force adjustment control is immediately performed, without operating the circuit for detecting the malfunction condition described above.

Figure 4:
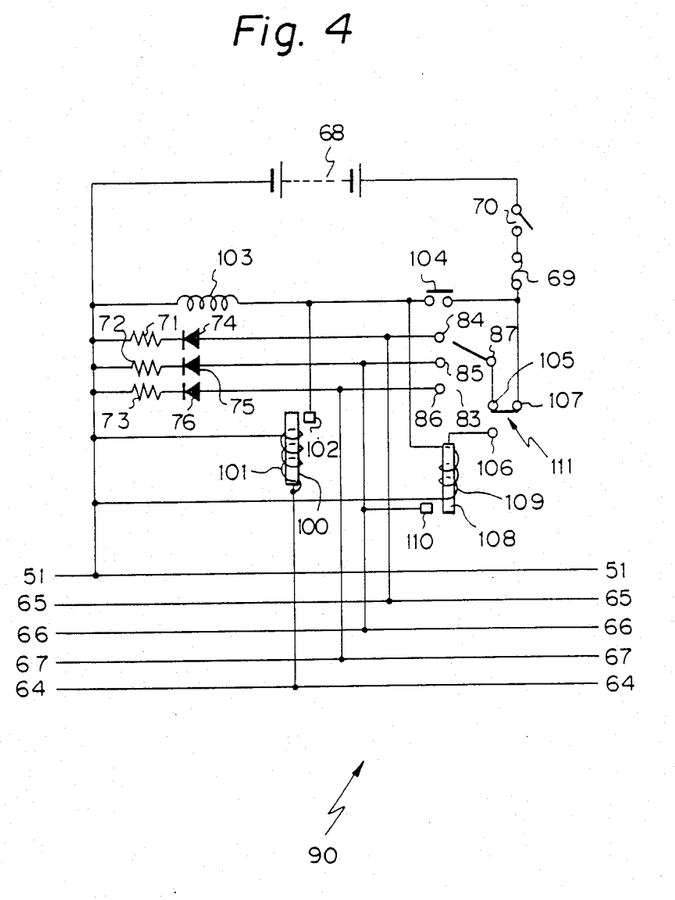
FIG. 4 is a circuit diagram illustrating a second embodiment of the present invention.

Although the selector switch 83 is provided on the negative side of the power source 68 in the embodiment described above, the switch 83 may be provided on the positive side of the power source 68, and a power supply circuit 90 similar to the power supply circuit 88 may be formed, as shown in FIG. 4 which discloses a second embodiment of the present invention. In this case, the direction of the diodes for every one of the hydraulic dampers must of course be correspondingly selected.

Figure 5:
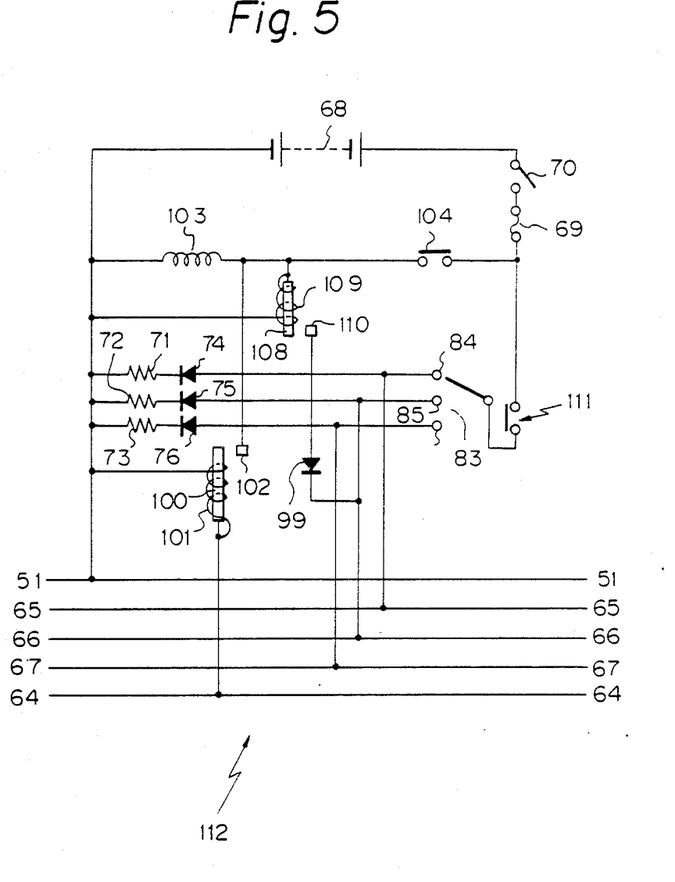
FIG. 5 is a circuit diagram illustrating a third embodiment of the present invention.

FIG. 5 shows one modification or a power supply circuit 112 of the circuit 90 shown in FIG. 4. When the bimetal device 100 contacts the contact 102 thereof, the excitation coil 103 of the relay is energized so that the contact device 104 is closed and the contact 111 is open. Thus, a closed loop circuit is formed through the positive terminal of the power source 68, the switch 70, the fuse 69, the contact device 104, the bimetal device 108, the contact 110, the diode 99, the diode 75, the resistor 72 and the negative terminal of the power source, in sequence. As a result, the forced damping force adjustment control can be accomplished. After the completion of the forced adjustment control, the bimetal device 108 and the contact 110 are not in contact, and the control is accordingly fixed.

Figure 6:
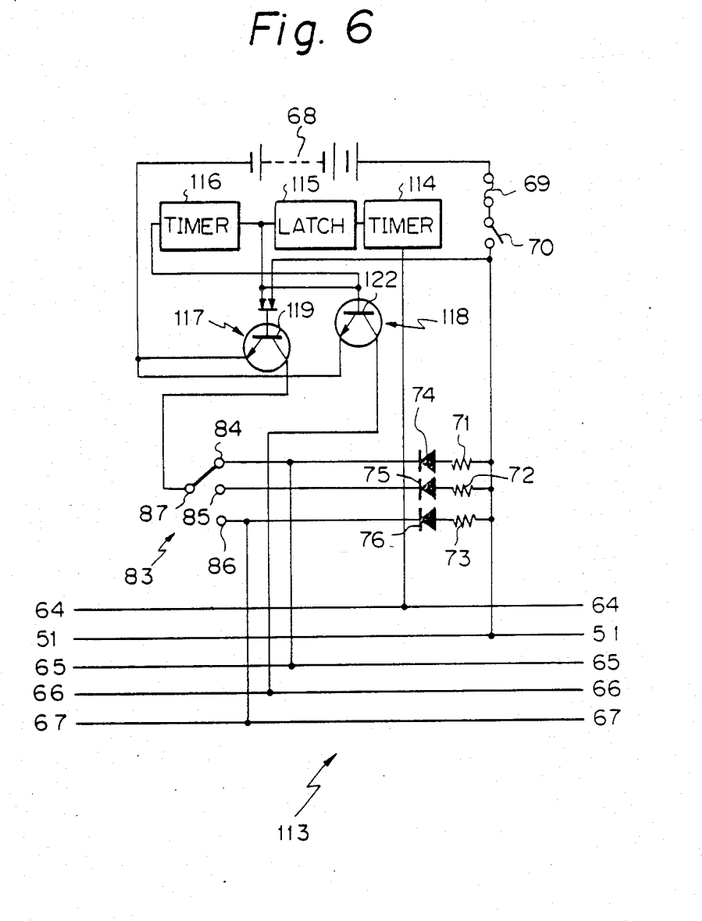
FIG. 6 is a circuit diagram illustrating a fourth embodiment of the present invention.

FIG. 6 shows one modification or a power supply circuit 113 of the circuit 88 shown in FIG. 3. When an input to a first timer circuit 114 goes to "LOW" level, the timer circuit is operated to start, and when the input thereto goes to "HIGH" level, it is reset. If the timer circuit 114 is started by, for example, the occurrence of the malfunction condition and then clocks a time much longer than that of the usual damping force adjustment control, a latch circuit 115 is operated to store the occurrence of the malfunction condition therein. At the same time, the latch circuit 115 outputs a signal to both a base 119 of a transistor 117 and a base 122 of a transistor 118. Thus, the transistor 117 is turned-off to stop the function of the selector switch 83, while the transistor 118 is turned-on to perform the forced damping force adjustment control, as described above. During this operation, a second timer circuit 116 is also operated to start. After a predetermined lapse of time, the timer circuit 116 outputs a signal to the base 122 of the transistor 118, so that the transistor 118 is turned-off to fix the forced adjustment control. In this case, the direction of the diodes for every one of the damping force adjustment circuits must of course be correspondingly selected.

Figure 7:
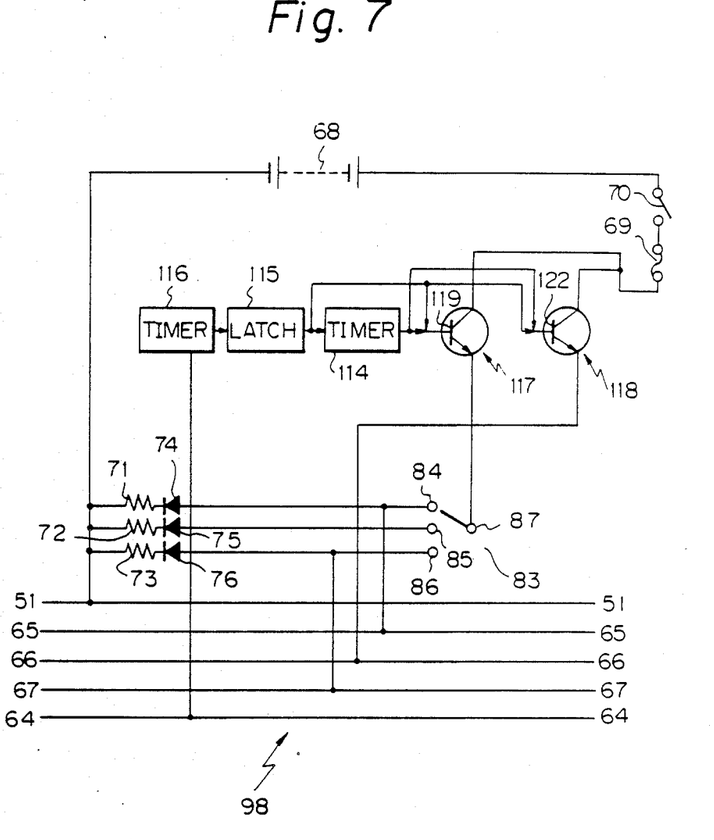
FIG. 7 is a circuit diagram illustrating a fifth embodiment of the present invention.

Although the selector switch 83 is provided on the negative side of the power source 68 in the embodiment described above, the switch 83 may be provided on the positive side of the power source 68, and a power supply circuit 98 similar to the power supply circuit 113 may be formed, as shown in FIG. 7.

Also, although the preferred embodiments have been described in detail herein, it will be apparent to those skilled in the art that numerous modifications and substitutions may be made within the scope of the invention. In particular, although the embodiments above are explained with respect to the light-emitting diodes acting as the indicator elements of the circuit, it will now be apparent that incandescent lamps may also be utilized as the indicator elements.

What is claimed is:

1. A control system for controlling the damping force of a plurality of hydraulic dampers, each of said dampers including: a damping force producing mechanism, a damping force adjustment member for adjusting the effective passage area of an oil passage in said damping force producing mechanism; an actuator for moving said damping force adjustment member; an electrical power supply circuit means for supplying electrical power to said actuator; a damping force selection means for selecting any adjusting position of said damping force adjustment member; and a means for stopping the supply of electrical power from said supply circuit means to said actuator when said damping force adjustment member is moved to an adjusting position of said damping force adjustment member which has been selected by said damping force selection means; said control system comprising:

a first means for monitoring an operating time of said actuator or a moving time of said damping force adjustment member and, when said operating time or moving time exceeds a first predetermined value, for disabling said damping force selection means so as to move said damping force adjustment member to a predetermined adjusting position; and a second means for monitoring an operating time of said first means and, when this operating time exceeds a second predetermined value, for stopping the supply of electrical power from said supply circuit means to said actuator.

2. A control system as set forth in claim 1, further including indicator circuit means for indicating normally adjusted and enroute conditions of said system and for indicating a malfunction condition thereof in response to the operation of said first means.

3. A control system as set forth in claim 1, wherein said first means comprises a first bimetal contact means which is energized by the supply of electrical power from said supply circuit means and a relay means which is operated in response to the operation of said first bimetal contact means, and wherein said second means comprises a second bimetal contact means which is energized by the operation of said first bimetal contact means.

4. A control system as set forth in claim 1, wherein said first means comprises: a first timer circuit, having a first preset time equal to said first predetermined value, for outputting a first signal when said first timer circuit reaches said first preset time; a first semiconductor switch for disabling said damping force selection means in response to said first signal from said first timer circuit, and a second semiconductor switch for supplying said electrical power to said actuator in response to said first signal so as to move said damping force adjustment member to said predetermined adjusting position; and said second means comprises a second timer circuit having a second preset time equal to said second predetermined value for outputting a second signal when said second timer circuit reaches said second preset time, and said second semiconductor switch stopping said supply of electrical power to said actuator in response to said second signal.

* * * * *